United States Patent [19]

Nakano et al.

[11] Patent Number: 5,873,028
[45] Date of Patent: Feb. 16, 1999

[54] TRANSMISSION POWER CONTROL APPARATUS AND METHOD IN A MOBILE COMMUNICATION SYSTEM

[75] Inventors: Etsuhiro Nakano, Yokosukashi; Narumi Umeda; Tomohiro Dohi, both of Yokohamashi, all of Japan

[73] Assignee: NTT Mobile Communications Network Inc., Toyko, Japan

[21] Appl. No.: 546,408

[22] Filed: Oct. 20, 1995

[30] Foreign Application Priority Data

Oct. 24, 1994 [JP] Japan .................................. 6-258489

[51] Int. Cl.⁶ .................................................. H04Q 7/20
[52] U.S. Cl. ............................ 455/69; 455/522; 455/63; 375/346
[58] Field of Search ................................ 455/69, 70, 504, 455/63, 522, 517; 375/346

[56] References Cited

U.S. PATENT DOCUMENTS

| | | | |
|---|---|---|---|
| 3,940,695 | 2/1976 | Sickles, II | 455/69 |
| 4,777,653 | 10/1988 | Bonnerot et al. | 455/69 |
| 5,239,667 | 8/1993 | Kanai | 455/10 |
| 5,245,629 | 9/1993 | Hall | 375/1 |

*Primary Examiner*—Edward Urban
*Attorney, Agent, or Firm*—Oblon, Spivak, McClelland, Maier & Neustadt, P.C.

[57] ABSTRACT

A transmission power control scheme for a mobile communication system for suppressing the transmission power to an absolutely necessary minimum level, and increasing the subscriber capacity by reducing an amount of interference. In this scheme, at a time of controlling a transmission power of each radio channel at one of the base station and the mobile station so as to make a difference between a target CIR and a reception CIR of each radio channel at another one of the base station and the mobile station smaller, the target CIR for all radio channels at that another one of the base station and the mobile station are set independently, and/or the target CIR for each radio channel is changed at that another one of the base station and the mobile station, according to a channel quality of each radio channel at either one of the base station and the mobile station.

21 Claims, 19 Drawing Sheets

⎯⎯⎯→ DATA SIGNAL
-------→ TRANSMISSION POWER CONTROL SIGNAL

FIG.6

| TRANSMISSION POWER CONTROL DATA ||
|---|---|
| TRANSMISSION POWER CONTROL DATA VALUE | TRANSMISSION POWER ADJUSTMENT AMOUNT |
| 0 | -2.0dB |
| 1 | -1.5dB |
| 2 | -1.0dB |
| 3 | -0.5dB |
| 4 | 0.0dB |
| 5 | +0.5dB |
| 6 | +1.0dB |
| 7 | +1.5dB |
| 8 | +2.0dB |

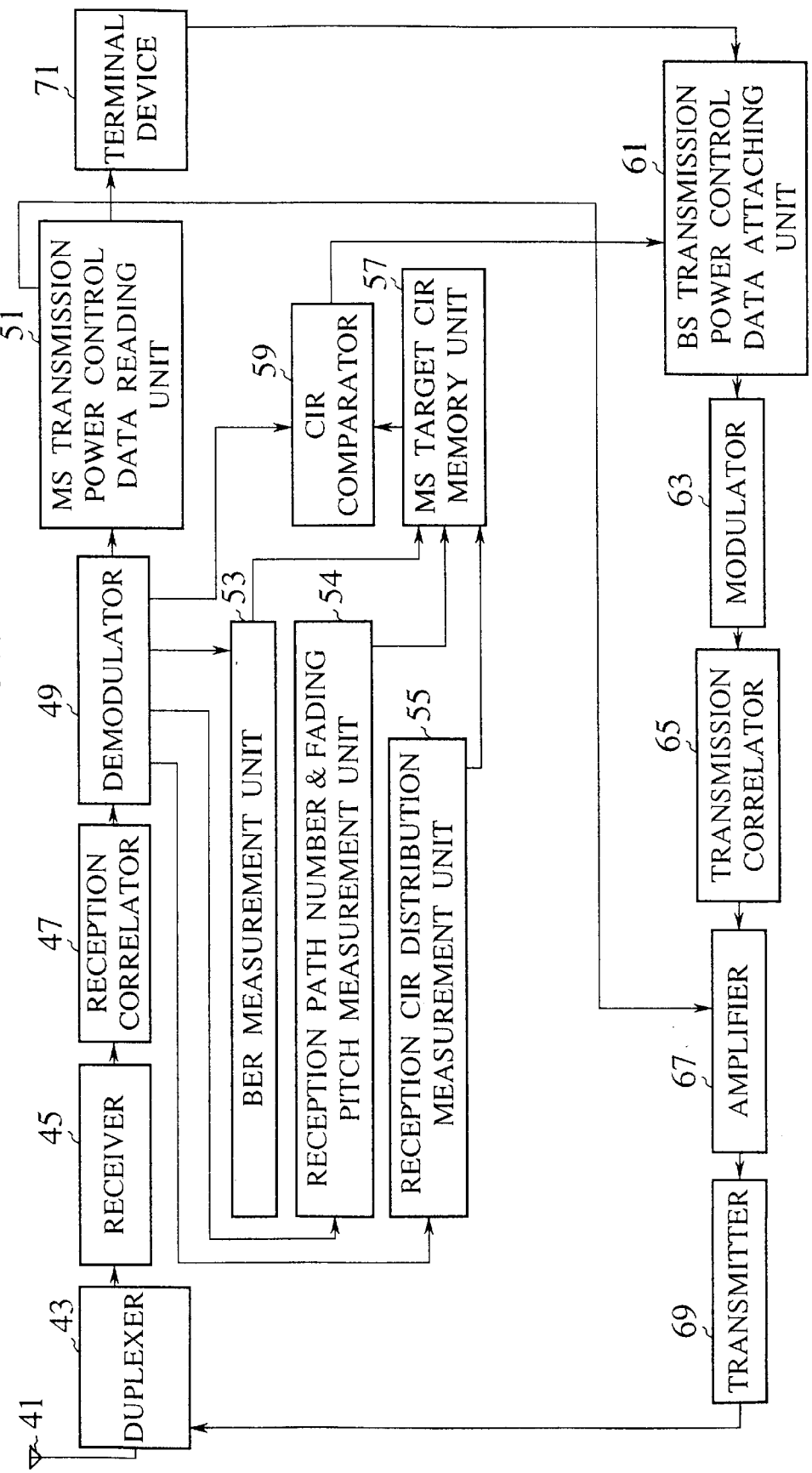

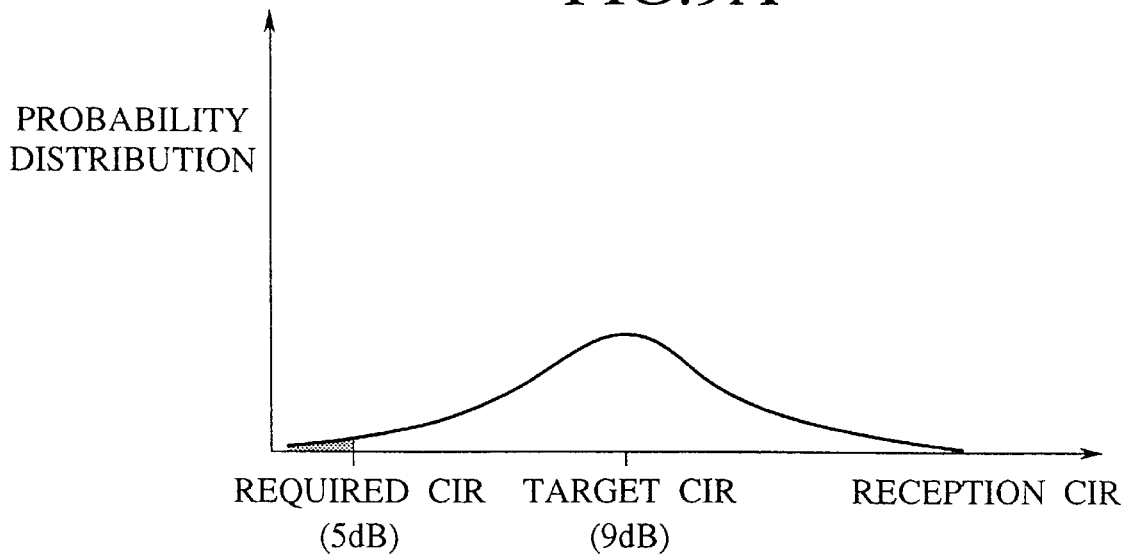
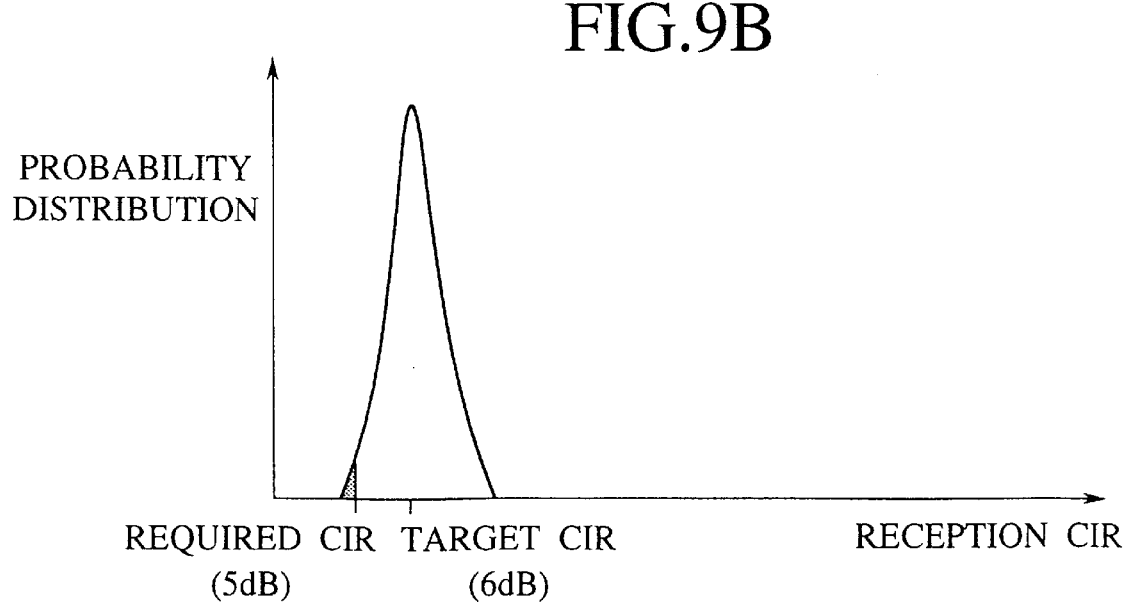

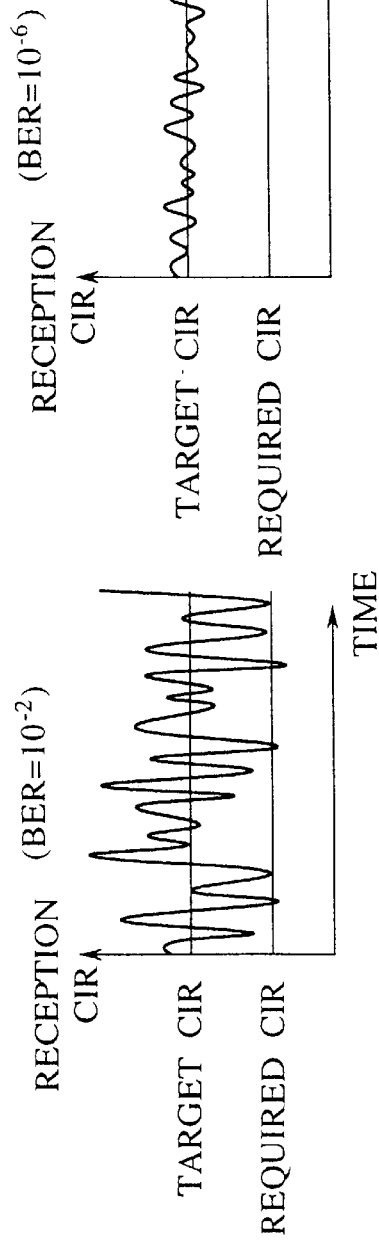
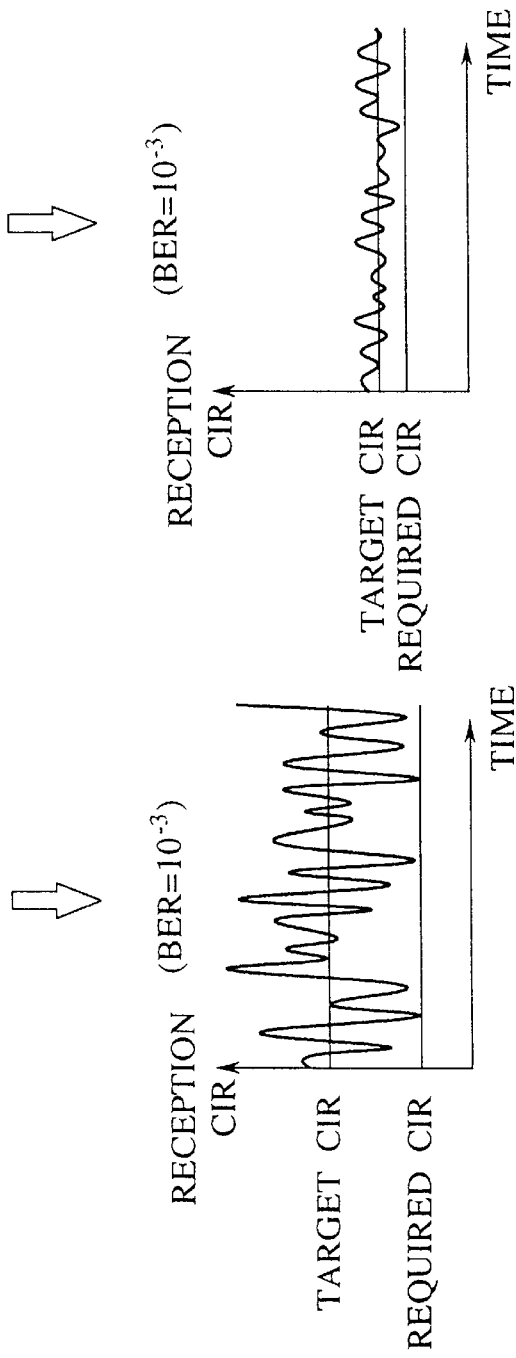
FIG.13A (FAST MOVING, FEW PATHS)
FIG.13B (SLOW MOVING, MANY PATHS)

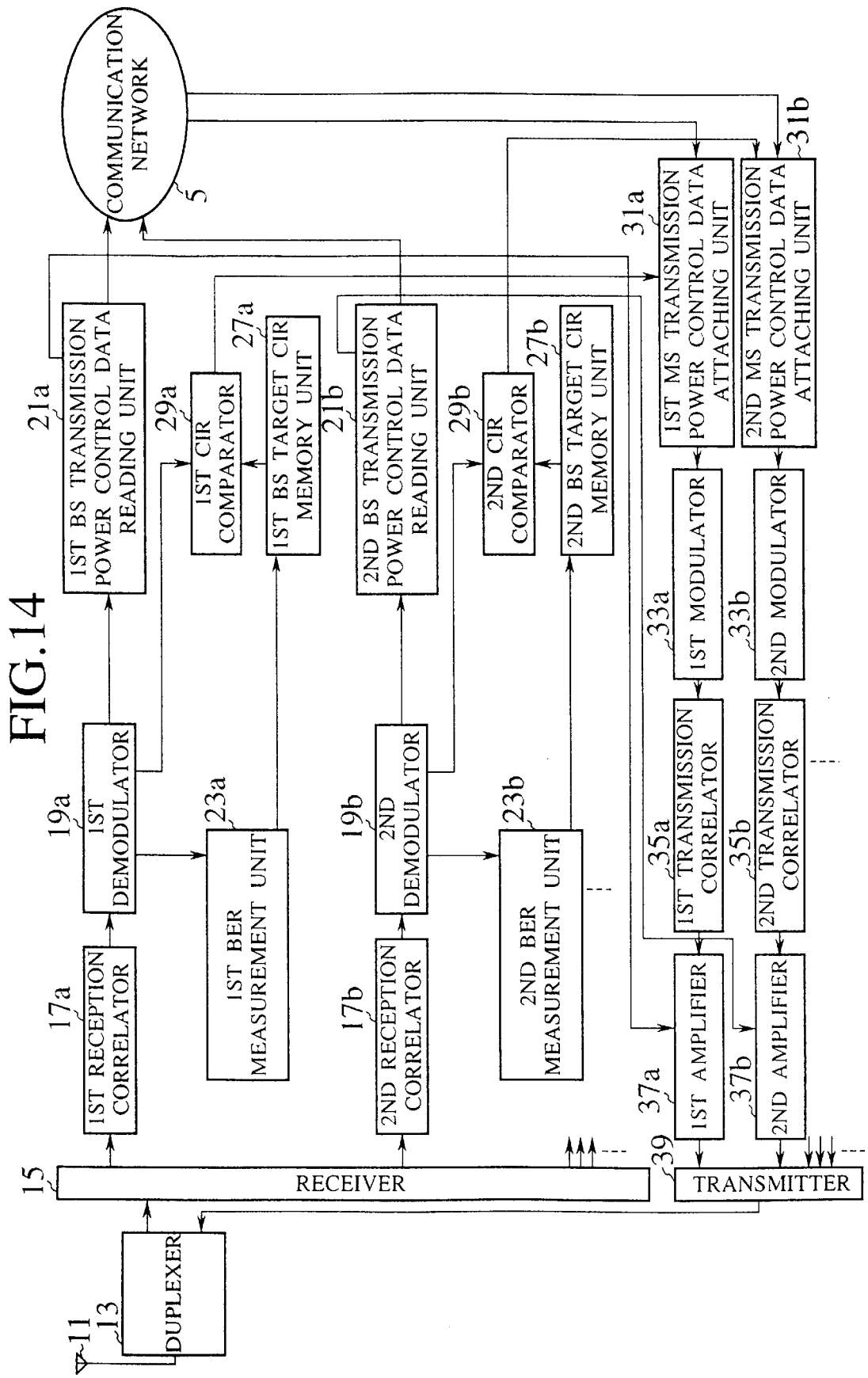

TRANSMISSION POWER CONTROL APPARATUS AND METHOD IN A MOBILE COMMUNICATION SYSTEM

BACKGROUND OF THE INVENTION

1. Field of the Invention

The present invention relates to a transmission power control scheme for a radio communication used in a mobile communication system.

2. Description of the Background Art

In a radio communication, a transmission power is usually controlled in order to suppress the transmission power. By means of this transmission power control, it is possible to realize advantageous effects such as a saving of a power consumption and a reduction of an interference to the other radio channels. In particular, such a transmission power control is indispensable in the CDMA (Code Division Multiple Access) scheme, as a reduction of an amount of interference with the other radio channels can directly lead to an increase of a subscriber capacity in the CDMA scheme.

Conventionally, there has been a proposition for a transmission power control in the CDMA scheme in which a transmission power of a mobile station is controlled such that a reception CIR (Carrier to Interference Ratio) at a base station becomes equal to a target CIR, while a transmission power of a base station is controlled such that a reception CIR at a mobile station becomes equal to a target CIR.

FIG. 1 shows an exemplary mobile communication system having a mobile station 101 and a base station 103, in which a conventional mobile station transmission power control scheme as indicated in FIG. 2 is carried out. In this conventional scheme, when the reception CIR at the base station 103 becomes lower than the target CIR, the base station 103 sends a transmission power control signal with a value "1" to the mobile station 101 in order to raise the transmission power at the mobile station 101. When this transmission power control signal with a value "1" is received, the mobile station 101 raises its transmission power for a prescribed amount such as 1 dB for example. On the contrary, when the reception CIR at the base station 103 becomes higher than the target CIR, the base station 103 sends the transmission power control signal with a value "0" to the mobile station 101 in order to lower the transmission power at the mobile station 101. When this transmission power control signal with a value "0" is received, the mobile station 101 lowers its transmission power for a prescribed amount such as 1 dB for example.

In practice, even when the transmission power is controlled to make the reception CIR equal to the target CIR, due to the measurement error or the control delay, it is generally impossible to make the reception CIR completely equal to the target CIR, and the reception CIR varies in time, so that there is a control error.

Here, an amount of variation of the reception CIR depends on a fading pitch and a number of reception paths. In the radio transmission, a plurality of delay waves at mutually different timings are generated via different paths. In the CDMA scheme, a wide bandwidth transmission using spread codes is carried out, so that it is possible to receive the aforementioned plurality of delay waves separately, and the reception characteristic can be improved by composing these separately received delay waves together. In general, a number of paths is greater for an area with more reflection objects such as an urban area.

Namely, when the fading pitch is small, the transmission power control cannot keep up with the fading variation due to the control delay, and an amount of variation of the CIR becomes large. On the contrary, when the fading pitch is large, the transmission power control can keep up with the fading variation, so that an amount of variation of the CIR becomes small. Also, when a number of reception paths is greater, it is possible to make an influence of the fading variation smaller by means of the path composition, so that an amount of variation of the CIR becomes smaller.

Now, in the conventional transmission power control scheme as described above, the target CIR is set to be a fixed value as shown in FIG. 3, with a sufficient margin above the required CIR such that the required communication quality can be satisfied even in a case of the largest variation of the reception CIR such as a case in which the mobile station is moving fast and there are only few paths available.

However, with this fixed setting of the target CIR, there is going to be a more than necessary amount of margin in a case an amount of variation of the reception CIR is small, so that the transmission power of the mobile station and the base station becomes higher than what is really necessary in such a case. Consequently, the conventional transmission power control involves the wasteful consumption of the transmission power and the unnecessary increase of the amount of interference with the other channels which in turn causes the unnecessary lowering of the subscriber capacity.

Moreover, according to the conventional transmission power control scheme as described above, it is necessary to set up the fixed target CIR by measuring or estimating an amount of variation of the reception CIR in advance at a time of system designing, which requires an extra amount of works at a time of system designing.

SUMMARY OF THE INVENTION

It is therefore an object of the present invention to provide a transmission power control scheme for a mobile communication system, capable of reducing the transmission power at the mobile station and the base station compared with a conventional scheme by suppressing the transmission power to an absolutely necessary minimum level, and increasing the subscriber capacity by reducing an amount of interference.

It is another object of the present invention to provide a transmission power control scheme for a mobile communication system, capable of simplifying a system designing.

According to one aspect of the present invention there is provided a method of transmission power control in a mobile communication system including a mobile station and a base station, the method comprising the steps of: controlling a transmission power of each radio channel at one of the base station and the mobile station so as to make a difference between a reception CIR (Carrier to Interference Ratio) and a target CIR of each radio channel at another one of the base station and the mobile station smaller; and changing the target CIR for each radio channel at said another one of the base station and the mobile station, according to a channel quality of each radio channel at either one of the base station and the mobile station.

According to another aspect of the present invention there is provided a method of transmission power control in a mobile communication system including a mobile station and a base station, the method comprising the steps of: controlling a transmission power of each radio channel at one of the base station and the mobile station so as to make a difference between a reception CIR (Carrier to Interference Ratio) and a target CIR of each radio channel at another one of the base station and the mobile station smaller; and setting the target CIR for all radio channels at said another one of the base station and the mobile station independently, according to a channel quality of each radio channel at either one of the base station and the mobile station.

According to another aspect of the present invention there is provided a base station communicating with a mobile station in a mobile communication system, comprising: means for controlling a transmission power of each radio channel at the mobile station so as to make a difference between a reception CIR (Carrier to Interference Ratio) and a target CIR of each radio channel at the base station smaller; and means for changing the target CIR for each radio channel, according to a channel quality of each radio channel at either one of the base station and the mobile station.

According to another aspect of the present invention there is provided a mobile station communicating with a base station in a mobile communication system, comprising: means for controlling a transmission power of each radio channel at the base station so as to make a difference between a reception CIR (Carrier to Interference Ratio) and a target CIR of each radio channel at the mobile station smaller; and means for changing the target CIR for each radio channel, according to a channel quality of each radio channel at either one of the base station and the mobile station.

According to another aspect of the present invention there is provided a base station in communication with a mobile station in a mobile communication system, comprising: means for controlling a transmission power of each radio channel at the mobile station so as to make a difference between a reception CIR (Carrier to Interference Ratio) and a target CIR of each radio channel at the base station smaller; and setting the target CIR for all radio channels at the base station independently, according to a channel quality of each radio channel at either one of the base station and the mobile station.

According to another aspect of the present invention there is provided a mobile station in communication with a base station in a mobile communication system, comprising: means for controlling a transmission power of each radio channel at the base station so as to make a difference between a reception CIR (Carrier to Interference Ratio) and a target CIR of each radio channel at the mobile station smaller; and setting the target CIR for all radio channels at the mobile station independently, according to a channel quality of each radio channel at either one of the base station and the mobile station.

Other features and advantages of the present invention will become apparent from the following description taken in conjunction with the accompanying drawings.

BRIEF DESCRIPTION OF THE DRAWINGS

FIG. 6 is a table of exemplary transmission power control data used in one embodiment of a transmission power control scheme according to the present invention.

FIG. 7 is a block diagram of a mobile station configuration in one embodiment of a transmission power control scheme according to the present invention.

FIGS. 9A and 9B are graphs of exemplary reception CIR distributions resulting from a first manner of changing target CIR in one embodiment of a transmission power control scheme according to the present invention.

FIGS. 13A and 13B are graphs of reception CIR versus time for explaining a second manner of changing target CIR in one embodiment of a transmission power control scheme according to the present invention.

FIG. 14 is a block diagram of a base station configuration suitable for the second manner of changing target CIR in one embodiment of a transmission power control scheme according to the present invention.

DETAILED DESCRIPTION OF THE PREFERRED EMBODIMENTS

Now, one embodiment of a transmission power control scheme for a mobile communication system according to the present invention will be described in detail.

Figure 1:
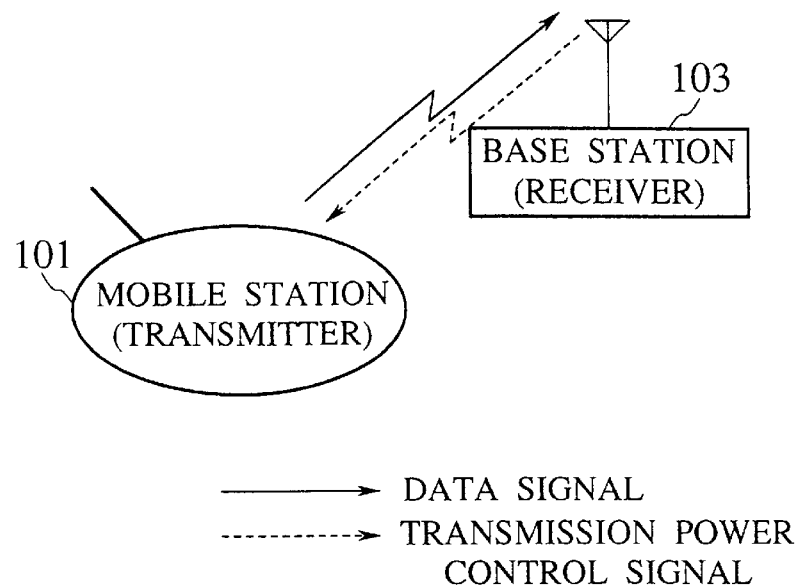
FIG. 1 is a schematic block diagram of a mobile communication system using a conventional transmission power control scheme.
Figure 2:
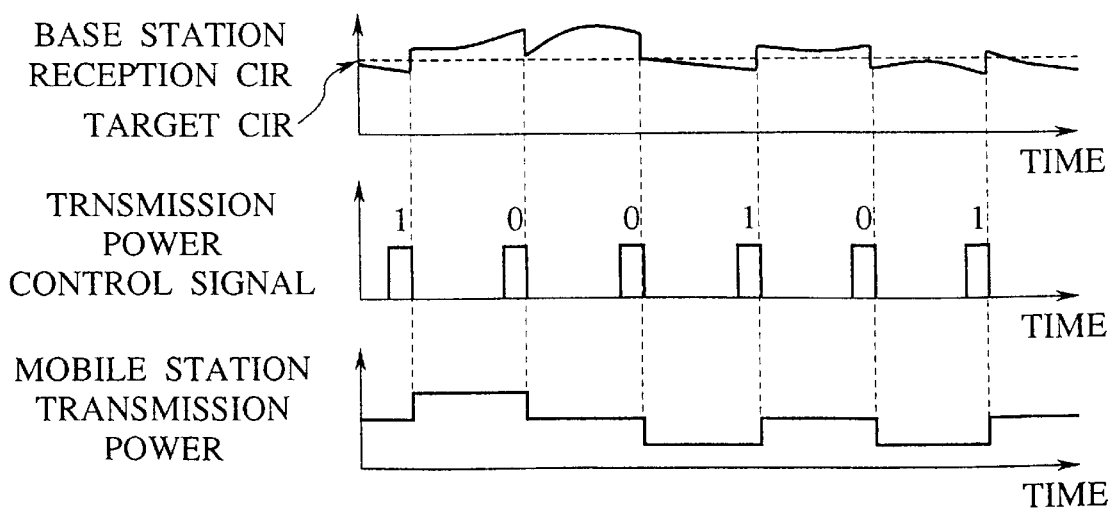
FIG. 2 is a timing chart for explaining the conventional transmission power control scheme used in the mobile communication system of FIG. 1.
Figure 3:
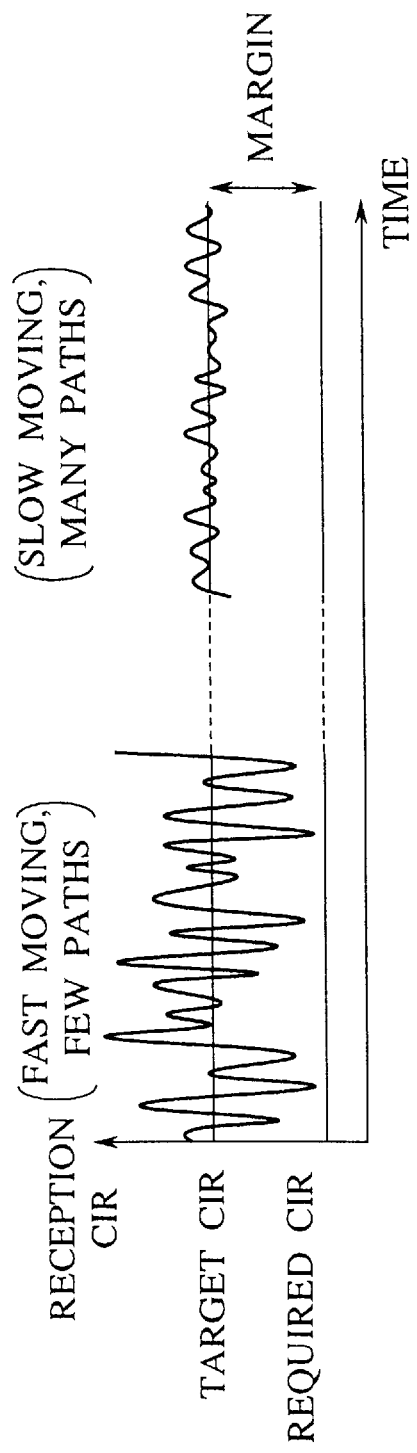
FIG. 3 is a graph of reception CIR versus time for explaining the conventional transmission power control scheme of FIG. 2.
Figure 4:
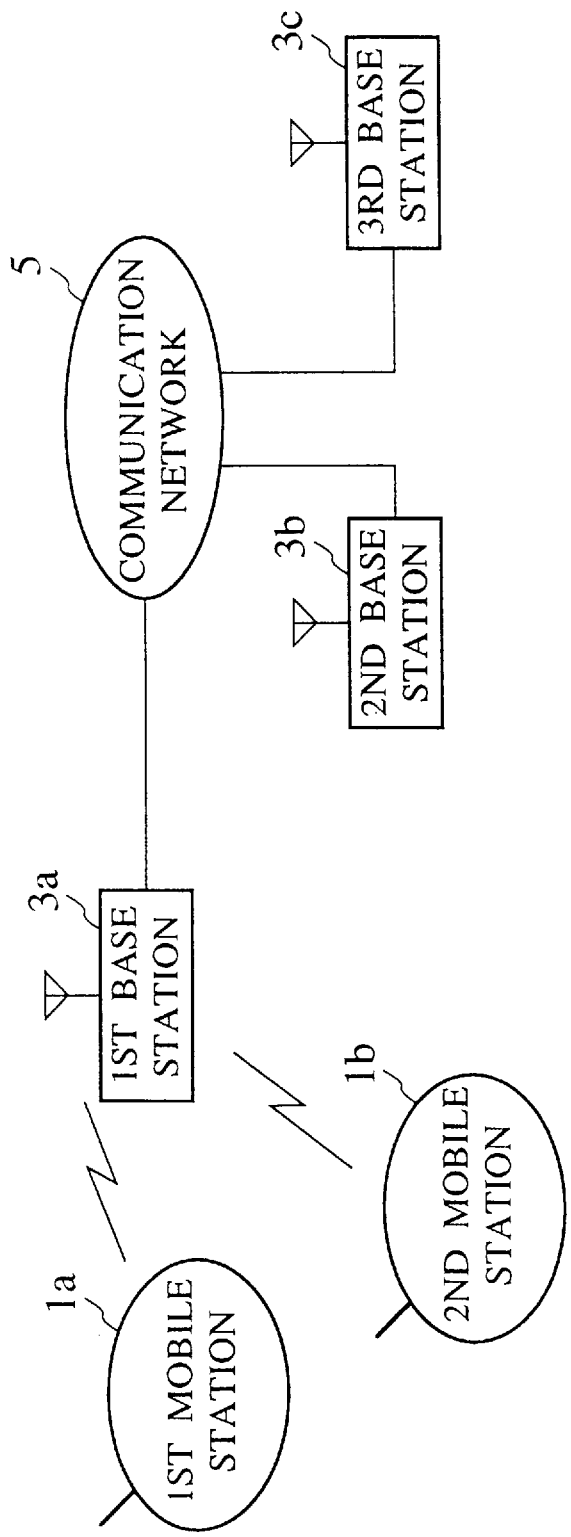
FIG. 4 is a schematic block diagram of a mobile communication system suitable for one embodiment of a transmission power control scheme according to the present invention.

In this embodiment, a mobile communication system has a schematic configuration as shown in FIG. 4, which comprises first and second mobile stations 1a and 1b, and first, second and third base stations 3a, 3b, and 3c which are connected through a communication network 5.

In this mobile communication system of FIG. 4, the first mobile station 1a and the second mobile station 1b are connected with the first base station 3a through radio channels. Then, the transmission powers of the first and second mobile stations 1a and 1b and the first base station 3a are controlled according to the transmission power control scheme according to the present invention.

More specifically, the transmission power of the first mobile station 1a is controlled such that a difference between a reception CIR at the first base station 3a with respect to the first mobile station 1a (abbreviated hereafter as BSCIR1a) and a first base station target CIR (abbreviated hereafter as BSCIR1) becomes smaller, while the transmission power of the second mobile station 1b is controlled such that a difference between a reception CIR at the first base station 3a with respect to the second mobile station 1b (abbreviated hereafter as BSCIR2a) and a second base station target CIR (abbreviated hereafter as BSCIR2) becomes smaller. Also, the transmission power of the first base station 3a is controlled such that a difference between a reception CIR at the first mobile station 1a with respect to the first base station 3a (abbreviated hereafter as PSCIR1a) and a first mobile station target CIR (abbreviated hereafter as PSCIR1) becomes smaller, while a difference between a reception CIR at the second mobile station 1b with respect to the first base station 3a (abbreviated hereafter as PSCIR2a) and a second mobile station target CIR (abbreviated hereafter as PSCIR2) becomes smaller.

Figure 5:
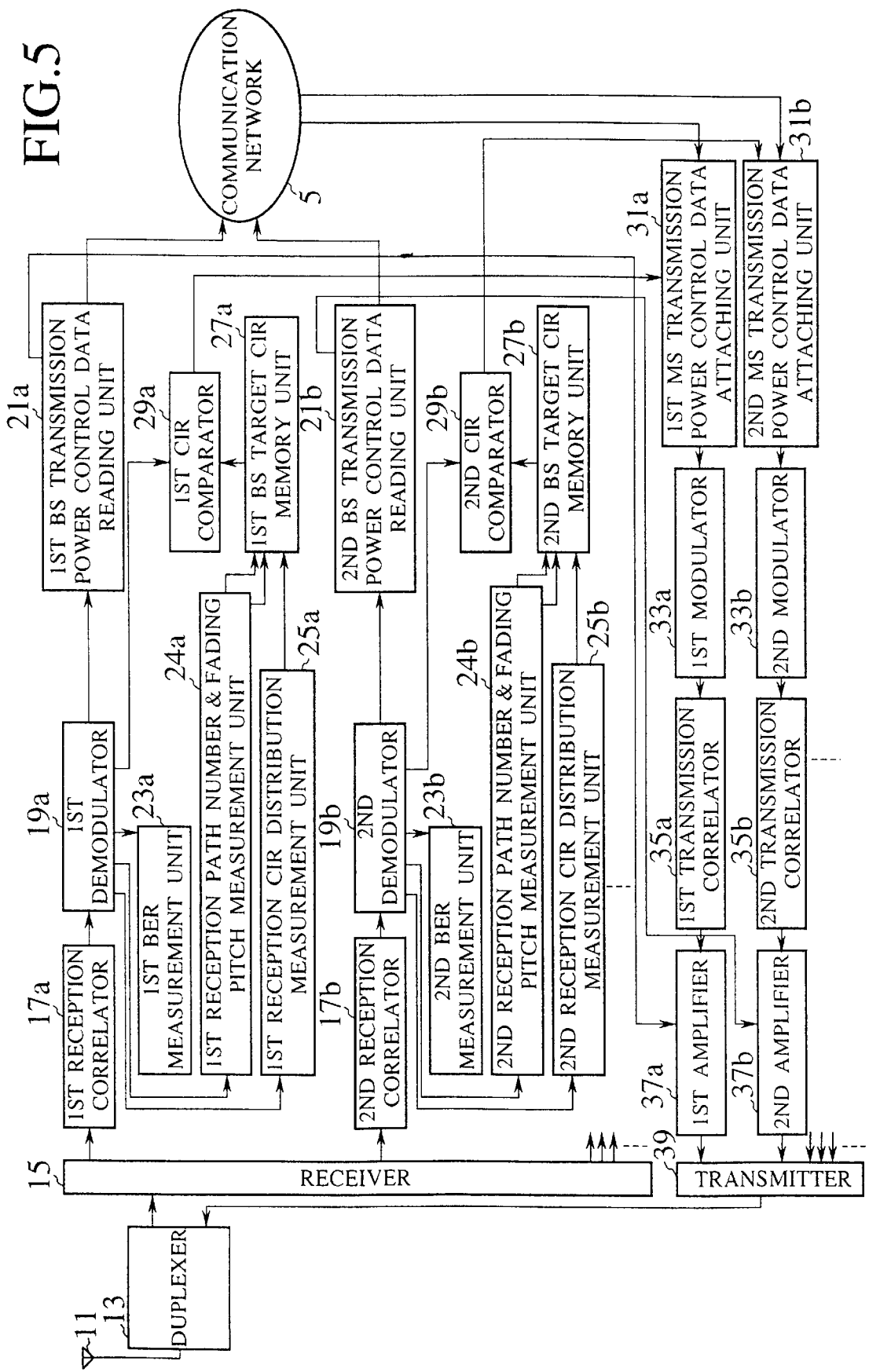
FIG. 5 is a block diagram of a base station configuration in one embodiment of a transmission power control scheme according to the present invention.

In this embodiment, each base station 3 has a configuration as shown in FIG. 5 in a case of using the CDMA scheme. Here, FIG. 5 shows a general configuration of a base station 3 which can deal with a plurality of mobile stations 1a, 1b, etc., but a section corresponding to one mobile station is substantially the same as another section corresponding to another mobile station, so that FIG. 5 only depicts sections corresponding to two mobile stations, and only a section corresponding to one mobile station will be described in detail below. In the configuration of FIG. 5, an antenna 11, a duplexer 13, a receiver 15, and a transmitter 39 are commonly used by all radio channels.

In the base station configuration of FIG. 5, the signals received through the antenna 11, the duplexer 13, and the receiver 15 are sent to a first reception correlator 17a. (The received signals are also similarly sent to a second reception correlator 17b, etc. at this point.) This first reception correlator 17a selectively outputs the received signals of a radio channel transmitted from the first mobile station 1a, which are then demodulated by a first demodulator 19a, and an output of the first demodulator 19a is supplied to a first base station transmission power control data reading unit 21a. At this first base station transmission power control data reading unit 21a, the base station transmission power control data transmitted from the first mobile station 1a is read out from the received signals and supplied to a first amplifier 37a, while data signals contained in the received signals are sent to the communication network 5. Here, the base station transmission power control data is assumed to be transmitted along with the data signals, but it is also possible to transmit the base station transmission power control data and the data signals in separate channels.

As for the transmission signals, a mobile station transmission power control data is attached to the data signals sent from the communication network 5 at a first mobile station transmission power control data attaching unit 31a, and an output of the first mobile station transmission power control data attaching unit 31a is then modulated by a first modulator 33a, spread by a first transmission correlator 35a in correspondence to a radio channel to be received by the first mobile station 1a, and amplified by a first amplifier 37a according to the base station transmission power control data supplied from the first base station transmission power control data reading unit 21a. Then, an output of the first amplifier 37a is transmitted to the first mobile station 1a through the transmitter 39, the duplexer 13, and the antenna 11.

In this base station configuration of FIG. 5, the mobile station transmission power control is realized as follows.

First, a first CIR comparator 29a compares the BSCIR1a obtained from the first demodulator 19a with the BSCIR1 stored in a first base station target CIR memory unit 27a, and sends a mobile station transmission power control data according to a result of this comparison to the first mobile station transmission power control data attaching unit 31a, such that this mobile station transmission power control data is attached to the transmission data signals there.

Here, the mobile station transmission power control data takes a value ranging from "0" to "8" as shown in FIG. 6, for indicating the transmission power adjustment amounts in a range of −2.0 dB to +2.0 dB at 0.5 dB steps, for example. The mobile station transmission power control data attached to the transmission data signals is set to have such a value that the BSCIR1a becomes as close to the BSCIR1 as possible. In this case, an amount of change of the transmission power nearly coincides with an amount of change of the reception CIR, so that when the BSCIR1a is lower than the BSCIR1 by 1.2 dB for instance, the mobile station transmission power control data is set to take a value "6" indicating +1.0 dB increase of the transmission power. As a result, the mobile station transmission power will be increased by +1.0 dB after this mobile station transmission power control, so that the BSCIR1a will also be increased by about +1.0 dB to become close to the BSCIR1.

On the other hand, a first BER measurement unit 23a measures an average value of BER (Bit Error Rate), a first reception path number and fading pitch measurement unit 24a measures average values of a number of reception paths and a fading pitch, and a first reception CIR distribution measurement unit 25a measures a distribution of the BSCIR1a, from the output of the first demodulator 19a over a prescribed period of time, and according to these measurement results, the BSCIR1 stored in the first base station target CIR memory unit 27a is set and/or changed as will be described in detail below.

As for the transmission power of this base station 3, it is adjusted by changing an amplification rate at the first amplifier 37a according to the base station transmission power control data read out by the first base station transmission power control data reading unit 21a.

Also, in this embodiment, each mobile station 1 has a configuration as shown in FIG. 7 in a case of using the CDMA scheme.

In the mobile station configuration of FIG. 7, the signals received through an antenna 41, a duplexer 43, and a receiver 45 are sent to a reception correlator 47. This reception correlator 47 selectively outputs the received signals of a radio channel transmitted to this mobile station 1, which are then demodulated by a demodulator 49, and an output of the demodulator 49 is supplied to a mobile station transmission power control data reading unit 51. At this mobile station transmission power control data reading unit 51, the mobile station transmission power control data transmitted from the base station is read out from the received signals and supplied to an amplifier 67, while data signals contained in the received signals are sent to a terminal device 71. Here, the mobile station transmission power control data is assumed to be transmitted along with the data signals, but it is also possible to transmit the mobile station transmission power control data and the data signals in separate channels.

As for the transmission signals, a base station transmission power control data is attached to the data signals sent from the terminal device 71 at a base station transmission power control data attaching unit 61, and an output of the base station transmission power control data attaching unit 61 is then modulated by a modulator 63, spread by a transmission correlator 65 in correspondence to a radio channel to be transmitted from this mobile station 1, and amplified by an amplifier 67 according to the mobile station transmission power control data supplied from the mobile station transmission power control data reading unit 51. Then, an output of the amplifier 67 is transmitted to the base station through the transmitter 69, the duplexer 43, and the antenna 41.

In this mobile station configuration of FIG. 7, the base station transmission power control is realized as follows.

First, a CIR comparator 59 compares the reception CIR (such as PSCIR1a or PSCIR2a) obtained from the demodulator 49 with the mobile station target CIR (such as PSCIR1 or PSCIR2) stored in a mobile station target CIR memory unit 57, and sends a base station transmission power control data according to a result of this comparison to the base station transmission power control data attaching unit 61, such that this base station transmission power control data is attached to the transmission data signals there.

Here, the base station transmission power control data takes a value ranging from "0" to "8" as shown in FIG. 6, for indicating the transmission power adjustment amounts in a range of −2.0 dB to +2.0 dB at 0.5 dB steps, for example, similarly as the mobile station transmission power control data described above.

On the other hand, a BER measurement unit 53 measures an average value of BER, a reception path number and fading pitch measurement unit 54 measures average values of a number of reception paths and a fading pitch, and a reception CIR distribution measurement unit 55 measures a distribution of the BSCIR1a, from the output of the first demodulator 19a over a prescribed period of time, and according to these measurement results, the mobile station target CIR (such as PSCIR1 or PSCIR2) stored in the mobile station target CIR memory unit 57 is set and/or changed as will be described in detail below.

As for the transmission power of this mobile station 1, it is adjusted by changing an amplification rate at the amplifier 67 according to the mobile station transmission power control data read out by the mobile station transmission power control data reading unit 51.

Now, various detailed manners of changing or setting the target CIR at the base station 3 of FIG. 5 or the mobile station 1 of FIG. 7 in this embodiment of a transmission power control scheme for a mobile communication system according to the present invention will be described in detail.

First, a first manner of changing the target CIR according to the reception CIR variation state for each radio channel will be described.

In this first manner, the target CIR for each radio channel is changed according to a distribution of the reception CIR which is periodically measured by the reception CIR distribution measurement unit 25 or 55 for each radio channel. Here, a distribution of the reception CIR is basically to be measured at both of the mobile station 1 and the base station 3, but the distribution of the reception CIR measured at the mobile station 1 and the distribution of the reception CIR measured at the base station 3 are correlated with each other, so that it is also possible to change the target CIR at the base station 3 according to the distribution of the reception CIR measured at the mobile station 1, or to change the target CIR at the mobile station 1 according to the distribution of the reception CIR measured at the base station 3.

Figure 8A:
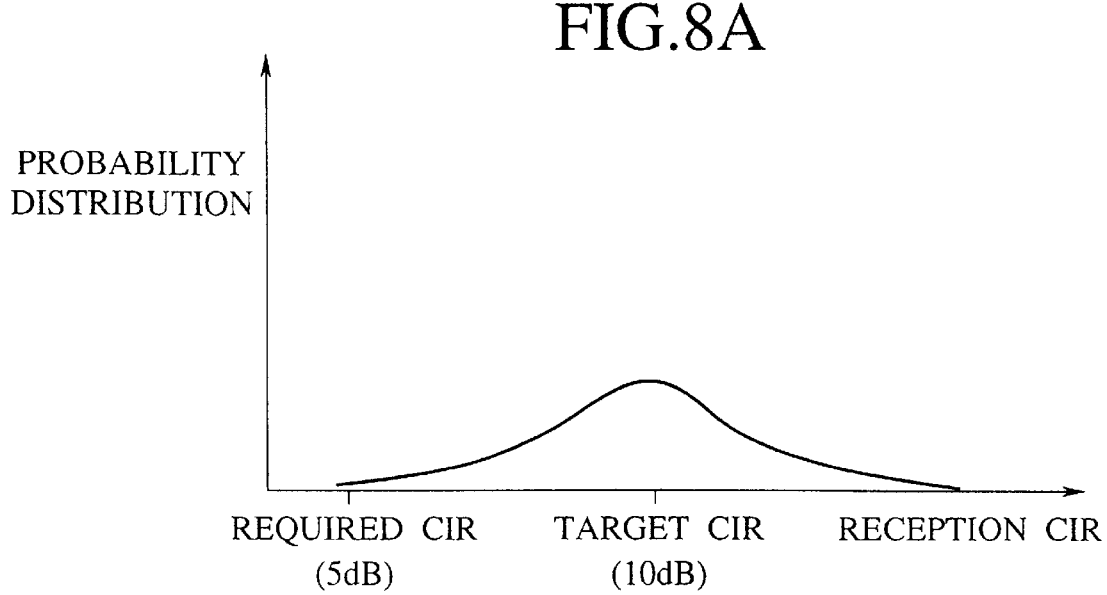
FIGS. 8A and 8B are graphs of exemplary reception CIR distributions used in a first manner of changing target CIR in one embodiment of a transmission power control scheme according to the present invention.
Figure 8B:
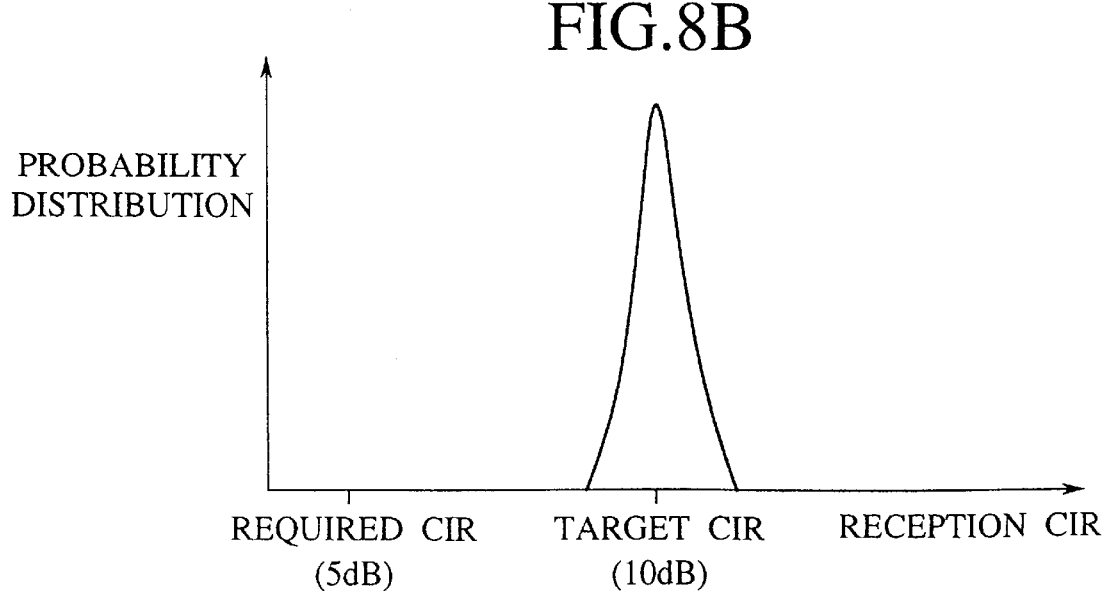

More specifically, the target CIR at the mobile station 1 is changed as follows. FIGS. 8A and 8B show exemplary probability distributions of the reception CIR at the mobile station 1 when the target CIR at the mobile station is set at 10 dB while the required CIR is 5 dB. Here, a period of time for obtaining these distributions is set to be longer than a transmission power control interval. For instance, when the transmission power control interval is equal to 1 msec., the reception CIR distribution is measured for 1 sec.

As already mentioned above, when the mobile station 1 is moving fast or when a number of reception paths at the mobile station 1 is small, an error of the reception CIR from the target CIR becomes large so that the reception CIR distribution is wide spread as shown in FIG. 8A. On the contrary, when the mobile station 1 is moving slow or when a number of reception paths at the mobile station 1 is large, an error of the reception CIR from the target CIR becomes small so that the reception CIR distribution is narrow as shown in FIG. 8B.

In this first manner, such a distribution of the reception CIR is measured periodically for each radio channel, and the target CIR for each radio channel is changed such that a probability for the reception CIR to be less than the required CIR becomes less than or equal to 1% for example. For the exemplary distributions of FIGS. 8A and 8B, it is possible to make the reception CIR greater than the required CIR of 5 dB for 99% of times by setting the target CIR at 9 dB in a case of FIG. 8A or at 6 dB in a case of of FIG. 8B, as indicated in FIGS. 9A and 9B, respectively. Thus, especially in a case of FIG. 8B, it is possible to lower the transmission power of the base station 3 with respect to the mobile station 1 considerably.

The target CIR at the base station 3 can be changed in substantially the same manner as described above for the target CIR at the mobile station 1.

Figure 10:
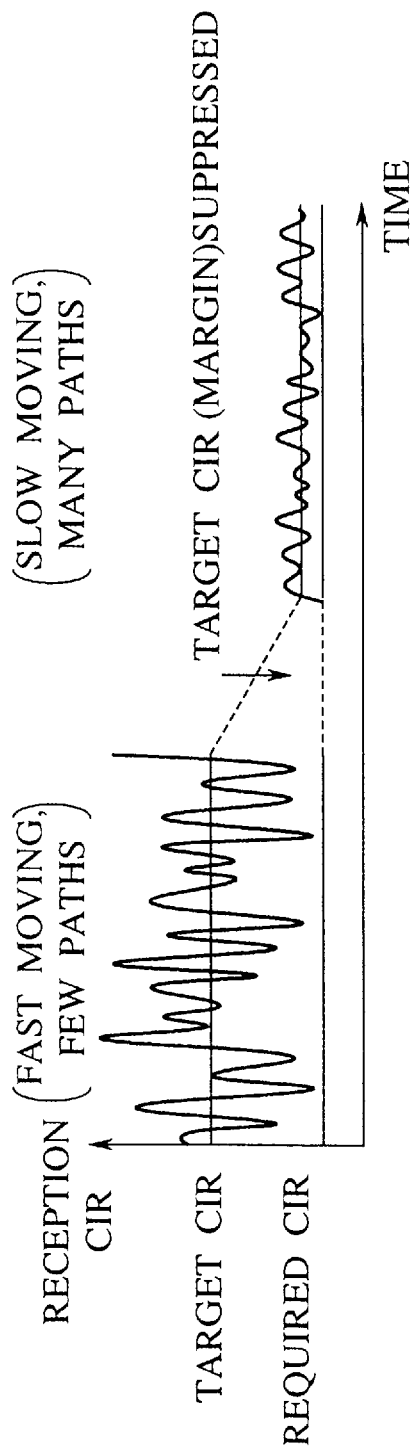
FIG. 10 is a graph of reception CIR versus time for explaining one embodiment of a transmission power control scheme according to the present invention.

Thus, in this first manner, the target CIR is made smaller when a distribution range of the reception CIR is smaller, as indicated in FIG. 10, such that the transmission power can be suppressed to the absolutely necessary minimum level while satisfying the required communication quality, and consequently an amount of interference given to the other radio channels can be reduced and the subscriber capacity can be increased.

In addition, the target CIR is set and changed automatically at each mobile station and each base station, so that there is no need to set up the target CIR manually, and therefore the system designing can be simplified significantly.

Figure 11:
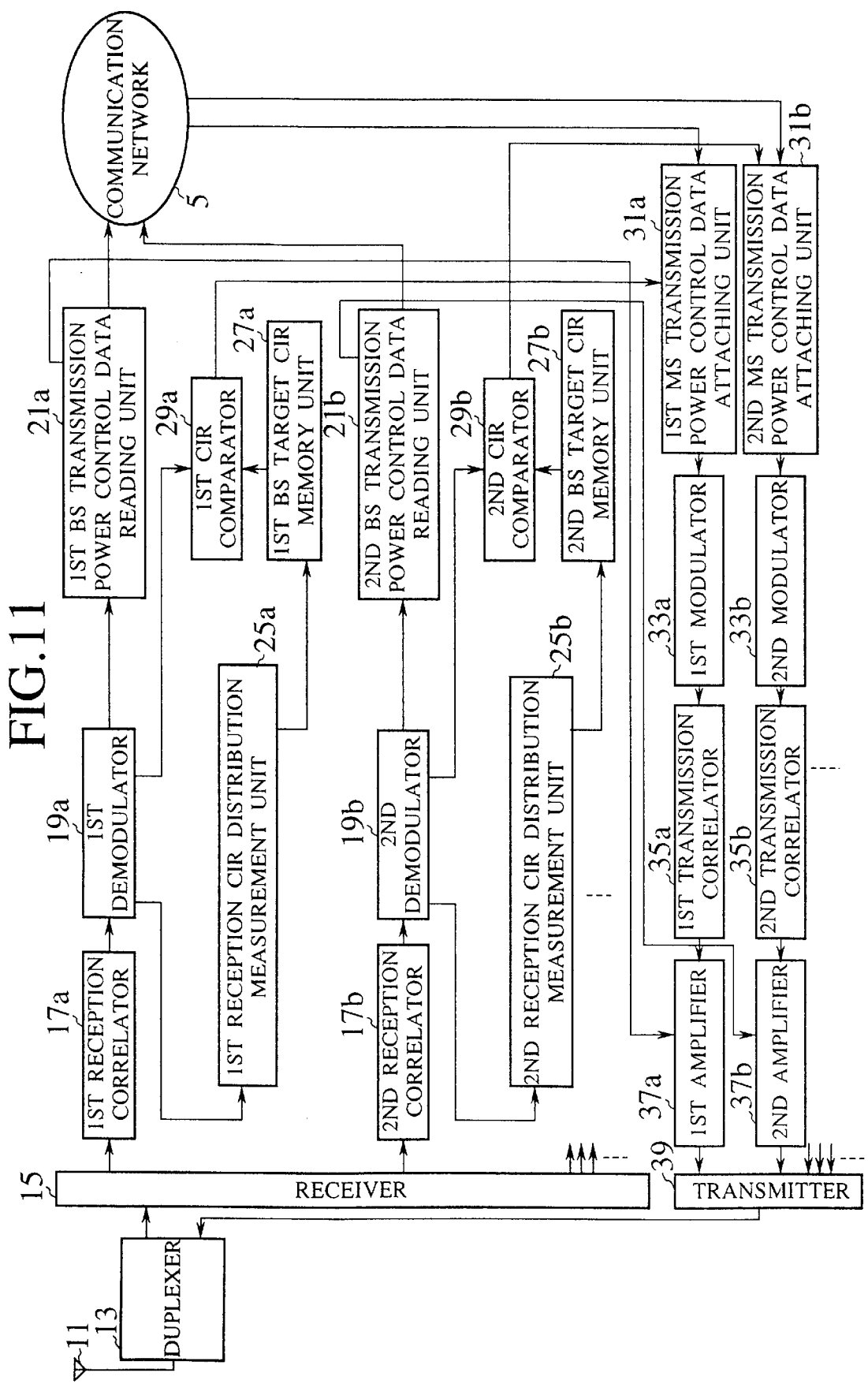
FIG. 11 is a block diagram of a base station configuration suitable for the first manner of changing target CIR in one embodiment of a transmission power control scheme according to the present invention.
Figure 12:
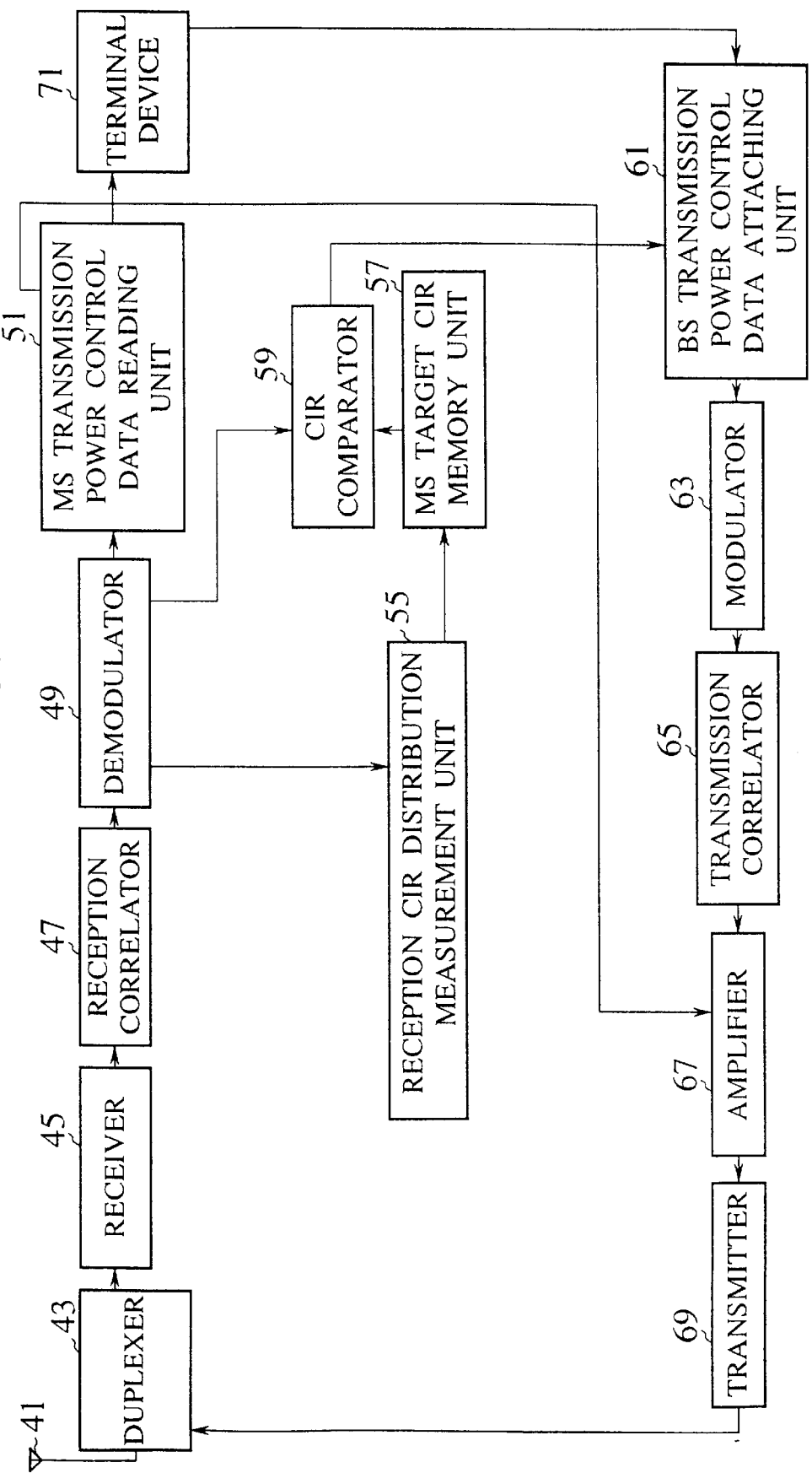
FIG. 12 is a block diagram of a mobile station configuration suitable for the first manner of changing target CIR in one embodiment of a transmission power control scheme according to the present invention.

It is to be noted that, when this first manner is adopted, the base station configuration of FIG. 5 can be simplified to that shown in FIG. 11 in which the BER measurement units 23 and the reception path number and fading pitch measurement units 24 are omitted, while the mobile station configuration of FIG. 7 can be simplified to that shown in FIG. 12 in which the BER measurement unit 53 and the reception path number and fading pitch measurement unit 54 are omitted.

Next, a second manner of changing the target CIR according to the BER for each radio channel will be described.

In this second manner, the target CIR for each radio channel is changed according to the BER which is periodically measured by the BER measurement unit 23 or 53 for each radio channel. Here, the BER is basically to be measured at both of the mobile station 1 and the base station 3, but the BER measured at the mobile station 1 and the BER measured at the base station 3 are correlated with each other, so that it is also possible to change the target CIR at the base station 3 according to the BER measured at the mobile station 1, or to change the target CIR at the mobile station 1 according to the BER measured at the base station 3.

More specifically, the target CIR at the mobile station 1 is changed according to the BER measured at the mobile station 1 as follows. Here, a simple case will be described for the sake of explanation. First, at the mobile station 1, the BER is measured for a period of time longer than the transmission power control interval. For instance, when the transmission power control interval is equal to 1 msec., the reception CIR distribution is measured for 1 sec., just as in the first manner described above. Here, the measurement of the BER is made by utilizing a bit sequence portion in a fixed pattern for synchronization, for example. Then, when the measurement result is larger than a prescribed required BER such as $10^{-3}$, the target CIR at the mobile station 1 is raised for 0.5 dB, whereas when the measurement result is smaller than the prescribed required BER, the target CIR at the mobile station 1 is lowered for 0.5 dB. By repeating this operation, the reception BER converges to a vicinity of the required BER.

In this second manner, when the mobile station 1 is moving fast or when a number of reception paths at the mobile station 1 is small such that an error of the reception CIR from the target CIR is large, the target CIR becomes larger as indicated in FIG. 13A, whereas when the mobile station 1 is moving slow or when a number of reception paths at the mobile station 1 is large such that an error of the reception CIR from the target CIR is small, the target CIR becomes smaller as indicated in FIG. 13B, so that in either case the reception BER takes a value close to the required BER. Consequently, in this second manner, regardless of a size of an error of the reception CIR from the target CIR, it is possible for all the mobile stations 1 to have a uniform reception BER, i.e., a uniform communication quality, while reducing the transmission power.

The target CIR at the base station 3 can be changed in substantially the same manner as described above for the target CIR at the mobile station 1.

Thus, in this second manner, the transmission power can be suppressed to the absolutely necessary minimum level while satisfying the required communication quality, and consequently an amount of interference given to the other radio channels can be reduced and the subscriber capacity can be increased, just as in the first manner described above.

In addition, in this second manner, the target CIR is going to be changed according to the feedback of the communication quality, i.e., the BER, so that it is possible to maintain the communication quality, i.e., the BER, at a constant level more accurately.

Figure 15:
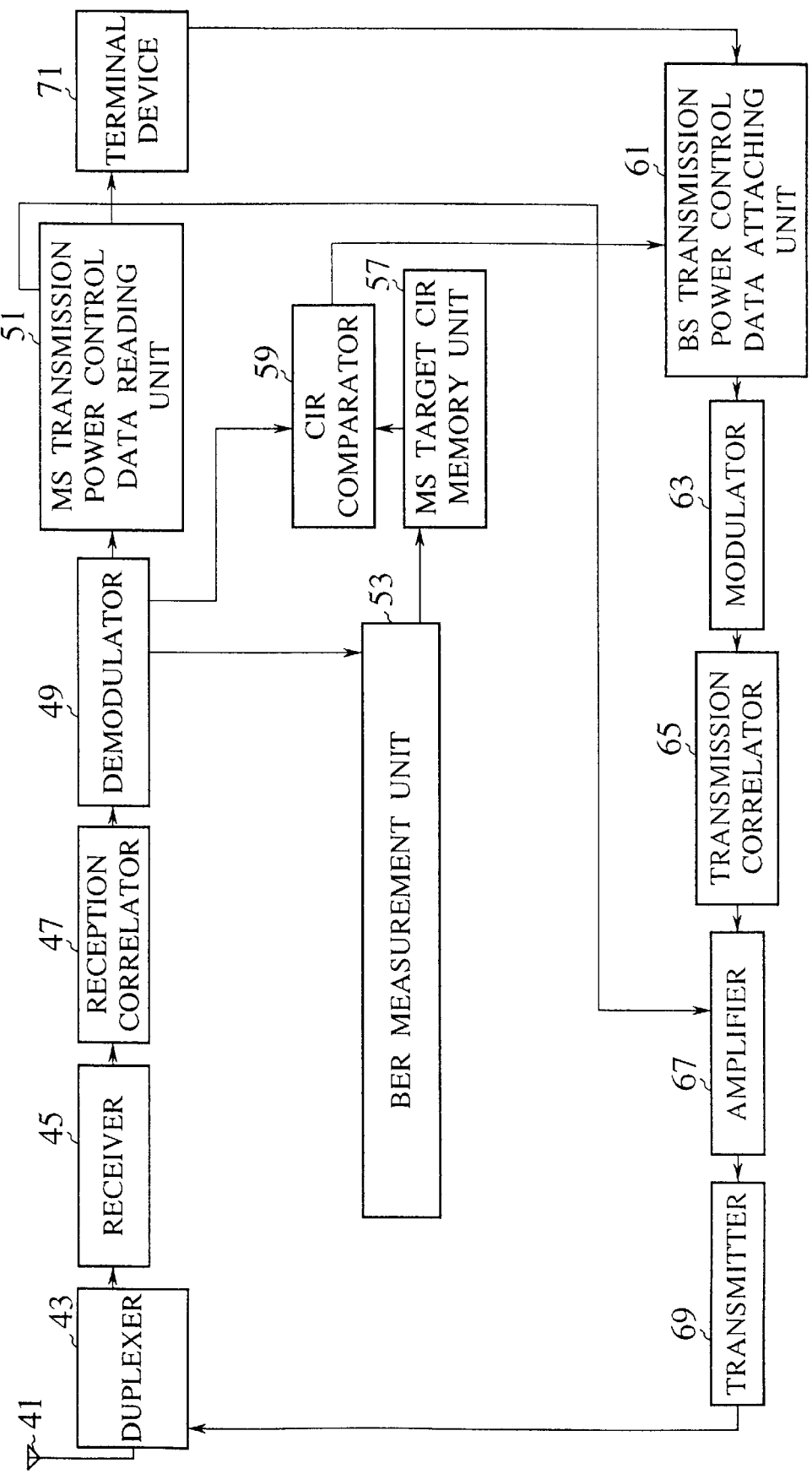
FIG. 15 is a block diagram of a mobile station configuration suitable for the second manner of changing target CIR in one embodiment of a transmission power control scheme according to the present invention.

It is to be noted that, when this second manner is adopted, the base station configuration of FIG. 5 can be simplified to that shown in FIG. 14 in which the reception path number and fading pitch measurement units 24 and the reception CIR distribution measurement unit 25 are omitted, while the mobile station configuration of FIG. 7 can be simplified to that shown in FIG. 15 in which the reception path number and fading pitch measurement unit 54 and the reception CIR distribution measurement unit 55 are omitted.

Next, a third manner of changing the target CIR of the mobile station 1 or the base station 3 according to the number of reception paths and the fading pitch will be described.

Figure 16:
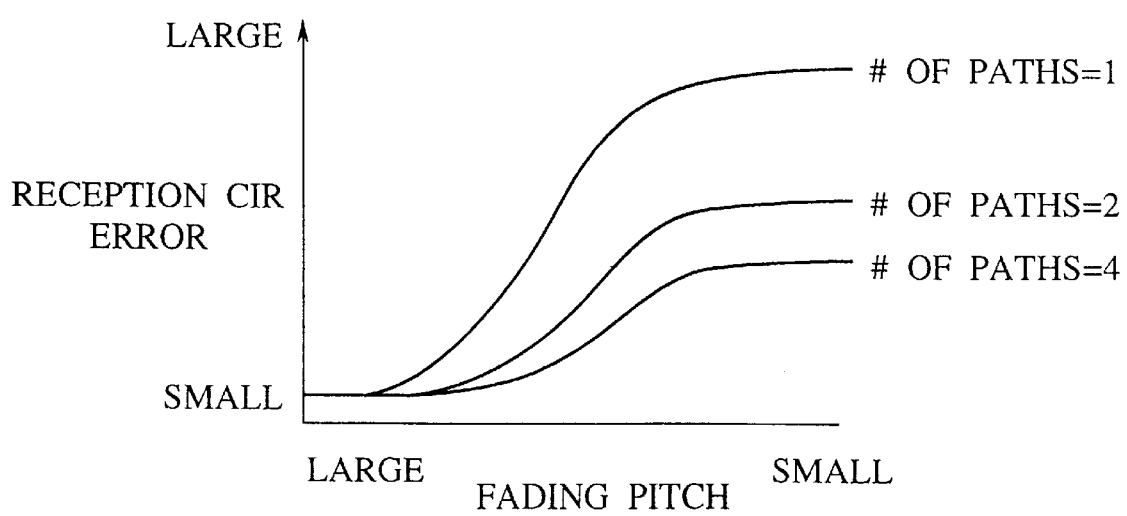
FIG. 16 is a graph showing relationships among a number of reception paths, a fading pitch, and a reception CIR error for explaining a third manner of changing target CIR in one embodiment of a transmission power control scheme according to the present invention.

In this third manner, the number of reception paths and the fading pitch have exemplary relationships with the reception CIR error as indicated in FIG. 16. Namely, as shown in FIG. 16, the error of the reception CIR from the target CIR becomes larger for the smaller fading pitch and for fewer reception paths. These relationships can be uniquely determined when the system parameters such as the transmission power control interval, etc. are determined. Therefore, a distribution of the reception CIR for each radio channel can be estimated from the periodical measurement results of the number of reception paths and the fading pitch for each radio channel.

Consequently, by changing the target CIR for each radio channel according to this estimated distribution of the reception CIR for each radio channel in substantially the same manner as in the first manner described above, it is also possible in this third manner to realize the reduction of the transmission power and the increase of the subscriber capacity just as in the first manner described above.

Thus, in this third manner, the transmission power can be suppressed to the absolutely necessary minimum level while satisfying the required communication quality, and consequently an amount of interference given to the other radio channels can be reduced and the subscriber capacity can be increased, just as in the first manner described above.

In addition, in this third manner, the measurement of the number of reception paths and the fading pitch can be made in a relatively short period of time, so that it is possible to realize a highly responsive transmission power control.

Figure 17:
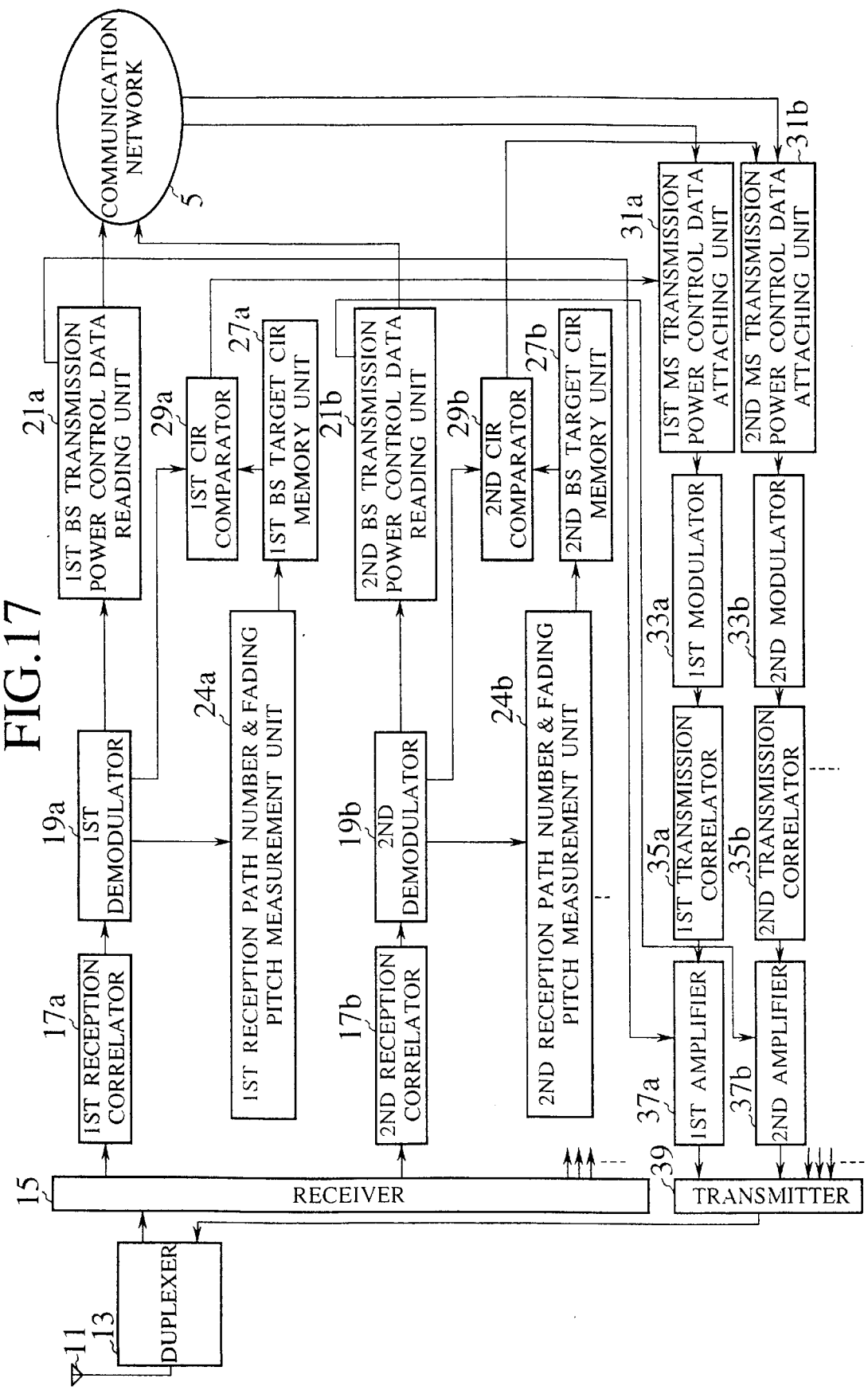
FIG. 17 is a block diagram of a base station configuration suitable for the third manner of changing target CIR in one embodiment of a transmission power control scheme according to the present invention.
Figure 18:
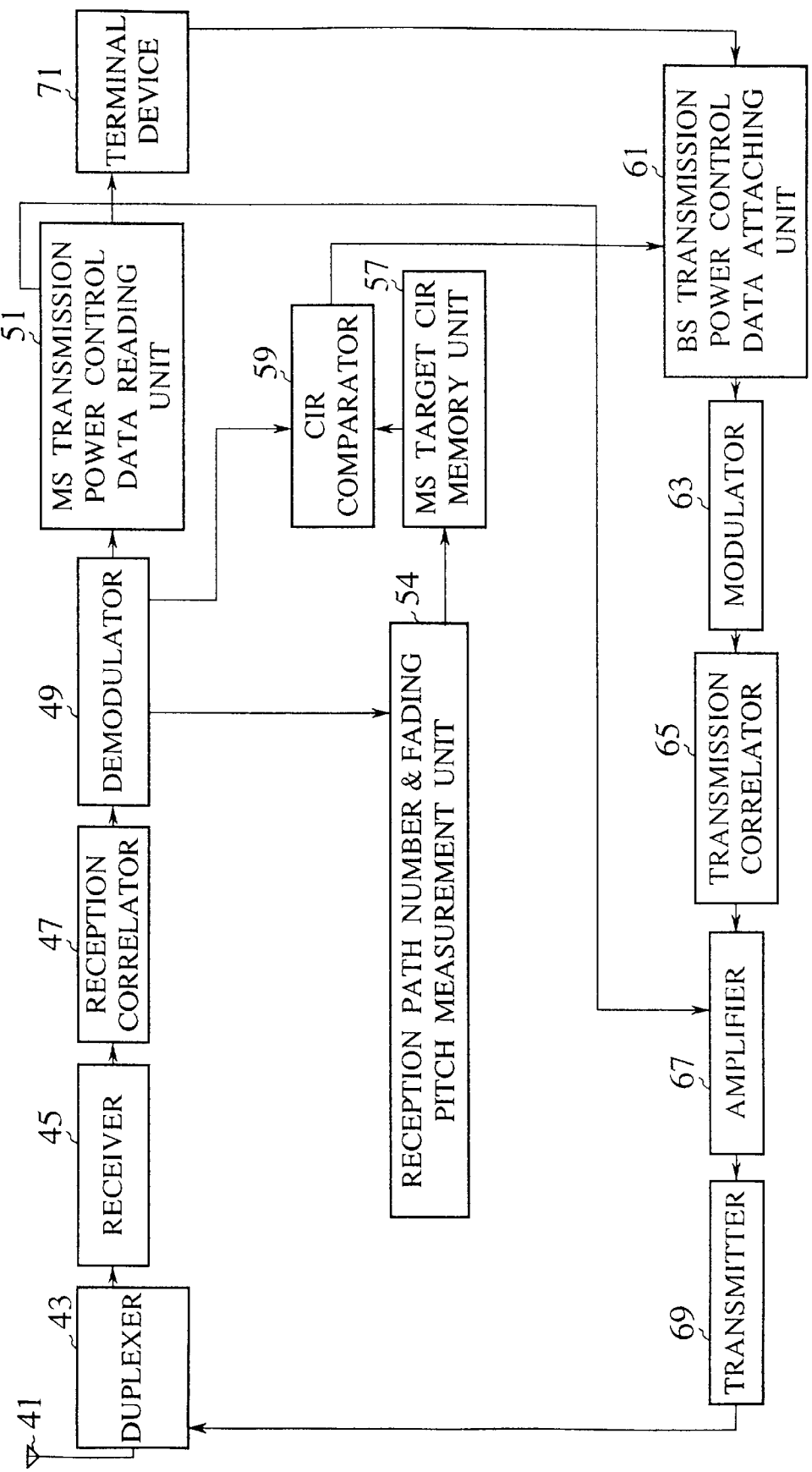
FIG. 18 is a block diagram of a mobile station configuration suitable for the third manner of changing target CIR in one embodiment of a transmission power control scheme according to the present invention.

It is to be noted that, when this third manner is adopted, the base station configuration of FIG. 5 can be simplified to that shown in FIG. 17 in which the BER measurement unit 23 and the reception CIR distribution measurement unit 25 are omitted, while the mobile station configuration of FIG. 7 can be simplified to that shown in FIG. 18 in which the BER measurement unit 53 and the reception CIR distribution measurement unit 55 are omitted.

Next, a fourth manner of setting the target CIR of each base station 3 by learning or predicting the reception CIR distribution characteristic for each base station 3 will be described.

In this fourth manner, the base station target CIR memory unit 27 incorporates learning/predicting means in a form of software or firmware for learning or predicting the reception CIR distribution characteristic. Here, the elements such as CPU which are necessary in carrying out this learning or predicting may be provided integrally within the base station target CIR memory unit 27 or separately outside the base station target CIR memory unit 27.

More specifically, the target CIR at each base station 3 is set as follows. First, the reception CIR distribution characteristic for each radio channel is measured or estimated in substantially the same manner as in the first manner or the third manner described above, and all the measurement results obtained at each base station 3 are accumulated and averaged to obtain an average reception CIR distribution characteristic, which is then stored as the learning result. Here, in the area such as an urban area where the mobile station 1 is moving relatively slow and a number of reception paths is large, there is a high probability for an error of the reception CIR from the target CIR to be small, whereas in the area such as a suburb area where the mobile station 1 is moving relatively fast and a number of reception paths is small, there is a high probability for an error of the reception CIR from the target CIR to be large.

Then, according to the obtained learning result, the target CIR is set such that a probability for the reception CIR to be less than the required CIR becomes less than or equal to 1% for example, similarly as in the first manner described above. In this manner, it is also possible in this fourth manner to realize the reduction of the transmission power and the increase of the subscriber capacity similarly as in the first manner described above.

This fourth manner for setting the target CIR differently for each base station 3 cannot account for the difference of the mobile stations, but it is quite effective in a case of determining the initial value of the target CIR.

Also, this fourth manner by itself is less effective in the reduction of the transmission power and the increase of the subscriber capacity compared with a case of changing the target CIR for each radio channel as in the first to third manners described above, but instead, this fourth manner requires less control load.

On the other hand, in a case of predicting the reception CIR distribution characteristic, the target CIR at each base station 3 is set as follows. First, the average reception CIR distribution characteristic is predicted by predicting an average number of reception paths, an average moving speed, etc. according to data on buildings within the service area. Here, the known method for predicting the delay spread using data on a number and positions of the buildings can be utilized in predicting the delay spread characteristic and the number of reception paths at each base station 3. The predicted average reception CIR distribution characteristic is then stored as the prediction result.

Then, according to the obtained prediction result, the target CIR is set such that a probability for the reception CIR to be less than the required CIR becomes less than or equal to 1% for example, similarly as in the first manner described above. In this manner, it is also possible in this case to realize the reduction of the transmission power and the increase of the subscriber capacity similarly as in the first manner described above.

Figure 19:
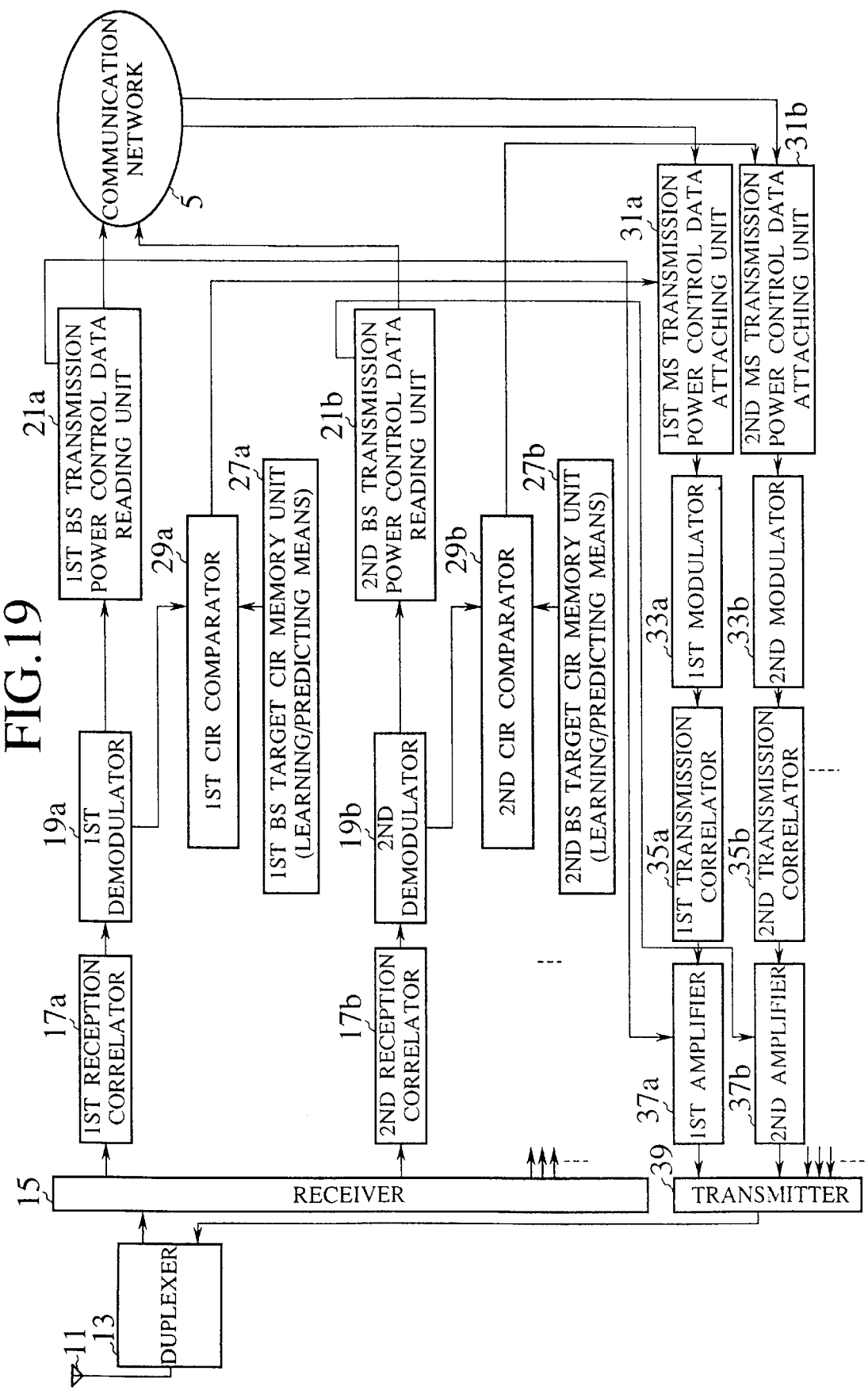
FIG. 19 is a block diagram of a base station configuration suitable for the fourth manner of setting target CIR in one embodiment of a transmission power control scheme according to the present invention.

Moreover, in this case, the base station configuration of FIG. 5 can be simplified to that shown in FIG. 19 in which the BER measurement units 23, the reception path number and fading pitch measurement units 24, and the reception CIR distribution measurement unit 25 are omitted, so that an amount of controls required in the base station 3 can also be reduced.

Next, a fifth manner of setting the target CIR of each mobile station 1 by learning the reception CIR distribution characteristic for each mobile station 1 will be described.

In this fifth manner, the mobile station target CIR memory unit 57 incorporates learning means in a form of software or firmware for learning the reception CIR distribution characteristic. Here, the elements such as CPU which are necessary in carrying out this learning may be provided integrally within the base station target CIR memory unit 57 or separately outside the base station target CIR memory unit 57.

More specifically, the target CIR at each mobile station 1 is set as follows. First, the reception CIR distribution characteristic for each radio channel is measured or estimated in substantially the same manner as in the first manner or the third manner described above, and all the measurement results obtained at each mobile station 1 are accumulated and averaged to obtain an average reception CIR distribution characteristic, which is then stored as the learning result. Here, the leaning result may be separately stored in each mobile station 1, or may be collectively stored in a database provided at the base station 3 side. As already mentioned above, in the area such as an urban area where the mobile station 1 is moving relatively slow and a number of reception paths is large, there is a high probability for an error of the reception CIR from the target CIR to be small, whereas in the area such as a suburb area where the mobile station 1 is moving relatively fast and a number of reception paths is small, there is a high probability for an error of the reception CIR from the target CIR to be large. That is, the reception CIR distribution characteristic changes according to the motion characteristic of the mobile station 1.

Then, according to the obtained learning result, the target CIR is set such that a probability for the reception CIR to be less than the required CIR becomes less than or equal to 1% for example, similarly as in the first manner described above. In this manner, it is also possible in this fifth manner to realize the reduction of the transmission power and the increase of the subscriber capacity similarly as in the first manner described above.

This fifth manner for setting the target CIR differently for each mobile station 1 cannot account for the difference of the base stations, but it is quite effective in a case of determining the initial value of the target CIR.

Also, this fifth manner by itself is less effective in the reduction of the transmission power and the increase of the subscriber capacity compared with a case of changing the target CIR for each radio channel as in the first to third manners described above, but instead, this fifth manner requires less control load.

Figure 20:
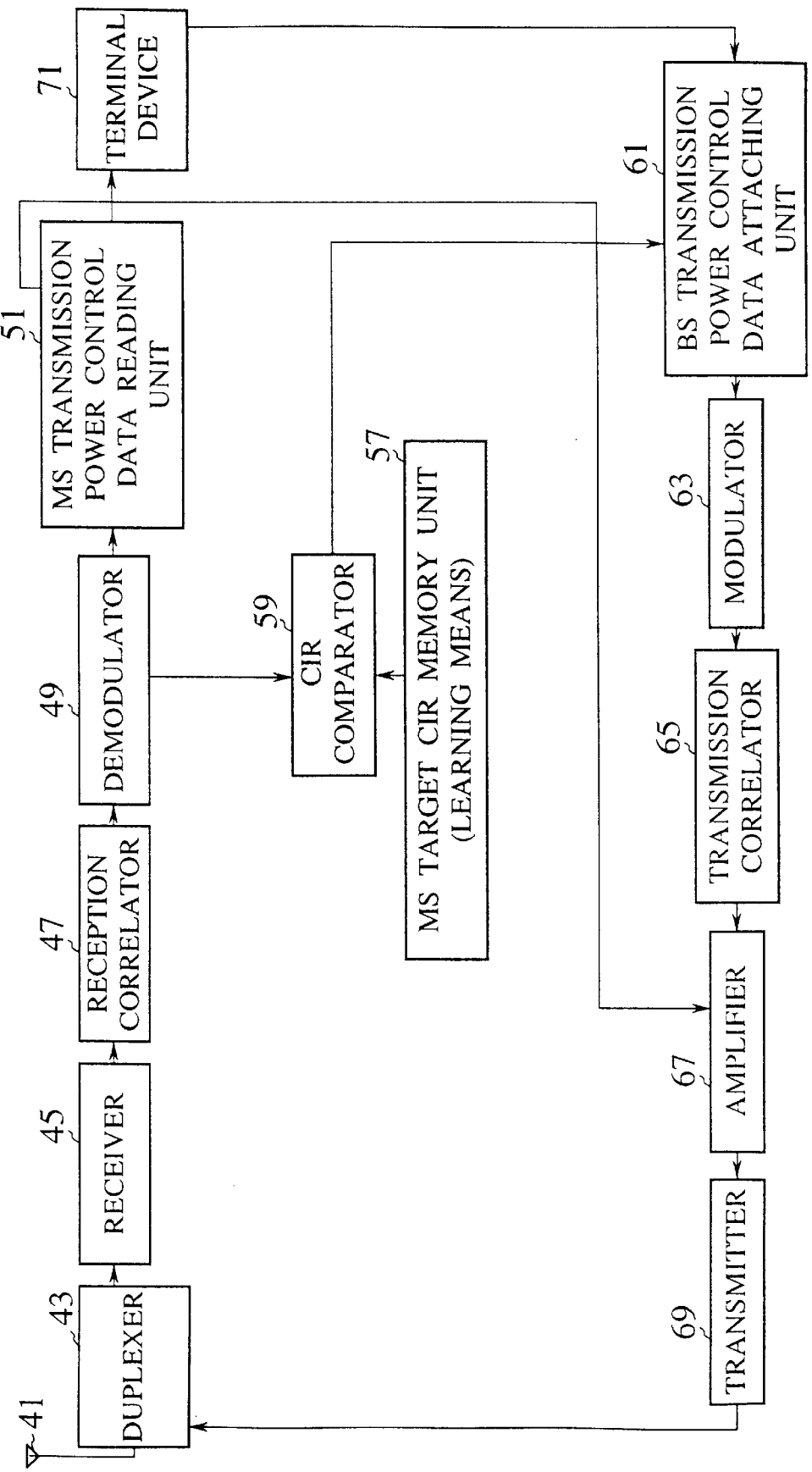
FIG. 20 is a block diagram of a base station configuration suitable for the fifth manner of setting target CIR in one embodiment of a transmission power control scheme according to the present invention.

It is to be noted that, in this case, the mobile station configuration of FIG. 7 may be simplified to that shown in FIG. 20 in which the BER measurement units 53, the reception path number and fading pitch measurement units 54, and the reception CIR distribution measurement unit 55 are omitted, so that an amount of controls required in the mobile station 1 can also be reduced.

As described, in the transmission power control scheme for a mobile communication system according to the present invention, it is possible to prevent each radio channel to have an excessive quality as the target CIR is set and changed differently for each mobile station and each base station, so that it is possible to reduce the transmission power. In addition, as an amount of interference can be reduced as a whole, so that the subscriber capacity can be increased easily in a case of using the CDMA scheme. Moreover, the target CIR is set and changed automatically at each mobile station and each base station according to the measurements results for the BER, etc., so that the system designing can be simplified significantly.

It is to be noted that the reception CIR used in the above description can be a quantity representing the reception level in general, while the reception CIR distribution, the BER, etc. used in the above description can be a quantity representing the channel quality in general. Here, however, in a case of using the reception level, the measurement becomes easier, but the communication quality is going to vary according to an amount of interference power, so that there is a need to set a larger margin for the target level than a case of using the reception CIR.

It is also to be noted that, besides those already mentioned above, many modifications and variations of the above embodiment may be made without departing from the novel and advantageous features of the present invention. Accordingly, all such modifications and variations are intended to be included within the scope of the appended claims.

What is claimed is:

1. A method of transmission power control in a mobile communication system including a mobile station and a base station, the method comprising the steps of:

controlling a transmission power of each radio channel at one of the base station and the mobile station so as to make a difference between a reception CIR (Carrier to Interference Ratio) and a target CIR of each radio channel at another one of the base station and the mobile station smaller; and changing the target CIR for each radio channel at said another one of the base station and the mobile station, according to a channel quality of each radio channel at either one of the base station and the mobile station;

wherein said either one of the base station and the mobile station has measurement means for measuring a distribution of the reception CIR for each radio channel periodically, and the changing step changes the target CIR according to the distribution of the reception CIR measured by the measurement means; and the changing step changes the target CIR such that a probability for the reception CIR to be lower than a required CIR becomes less than or equal to a prescribed value in the distribution of the reception CIR measured by the measurement means.

2. The method of claim 1, wherein said either one of the base station and the mobile station has measurement means for measuring the channel quality for each radio channel, and the changing step changes the target CIR to a minimum necessary value for making the channel quality measured by the measurement means to be greater than or equal to a required value.

3. The method of claim 1, wherein the target CIR and the reception CIR are given in terms of a target level and a reception level.

4. A method of transmission power control in a mobile communication system including a mobile station and a base station, the method comprising the steps of:

controlling a transmission power of each radio channel at one of the base station and the mobile station so as to make a difference between a reception CIR (Carrier to Interference Ratio) and a target CIR of each radio channel at another one of the base station and the mobile station smaller; and changing the target CIR for each radio channel at said another one of the base station and the mobile station, according to a channel quality of each radio channel at either one of the base station and the mobile station;

wherein said either one of the base station and the mobile station has measurement means for measuring a number of reception paths and a fading pitch for each radio channel periodically, and the changing step changes the target CIR according to the number of reception paths and the fading pitch measured by the measurement means.

5. The method of claim 4, wherein the changing step estimates a distribution of the reception CIR from the number of reception paths and the fading pitch measured by the measurement means, and changes the target CIR such that a probability for the reception CIR to be lower than a required CIR becomes less than or equal to a prescribed value in the estimated distribution of the reception CIR.

6. A method of transmission power control in a mobile communication system including a mobile station and a base station, the method comprising the steps of:

controlling a transmission power of each radio channel at the mobile station so as to make a difference between a reception CIR (Carrier to Interference Ratio) and a target CIR of each radio channel at the base station smaller; and setting the target CIR for all radio channels at the base station independently, according to a channel quality of each radio channel at either one of the base station and the mobile station;

wherein said either one of the base station and the mobile station has measurement means for measuring a distribution of the reception CIR for each radio channel, the base station has learning means for learning an average reception CIR distribution for the base station from the distribution measured by the measurement means, and the setting step sets the target CIR according to the average reception CIR distribution learned by the learning means such that a probability for the reception CIR to be lower than a required CIR becomes less than or equal to a prescribed value in the average reception CIR distribution learned by the learning means.

7. The method of claim 6, wherein said either one of the base station and the mobile station has measurement means for measuring the channel quality for each radio channel, the base station has learning means for learning an average channel quality characteristic for the base station from the channel quality measured by the measurement means, and the setting step sets the target CIR according to the average channel quality characteristic learned by the learning means.

8. A method of transmission power control in a mobile communication system including a mobile station and a base station, the method comprising the steps of:

controlling a transmission power of each radio channel at the mobile station so as to make a difference between a reception CIR (Carrier to Interference Ratio) and a target CIR of each radio channel at the base station smaller; and setting the target CIR for all radio channels at the base station independently, according to a channel quality of each radio channel at either one of the base station and the mobile station;

wherein the base station has predicting means for predicting a reception CIR distribution for said base station from data on buildings in an area covered by said base station, and the setting step sets the target CIR such that a probability for the reception CIR to be lower than a required CIR becomes less than or equal to a prescribed value in the reception CIR distribution predicted by the predicting means.

9. The method of claim 6, wherein the target CIR and the reception CIR are given in terms of a target level and a reception level.

10. A method of transmission power control in a mobile communication system including a mobile station and a base station, the method comprising the steps of:

controlling a transmission power of each radio channel at the mobile station so as to make a difference between a reception CIR (Carrier to Interference Ratio) and a target CIR of each radio channel at the base station smaller; and setting the target CIR for all radio channels at the base station independently, according to a channel quality of each radio channel at either one of the base station and the mobile station;

wherein said either one of the base station and the mobile station has measurement means for measuring a number of reception paths and a fading pitch for each radio channel, the base station has learning means for learning an average number of reception paths and an average fading pitch for the base station from the number of reception paths and the fading pitch measured by the measurement means, and the setting step sets the target CIR according to the average number of reception paths and the average fading pitch learned by the learning means.

11. The method of claim 10, wherein the setting step estimates an average reception CIR distribution from the average number of reception paths and the average fading pitch learned by the learning means, and sets the target CIR such that a probability for the reception CIR to be lower than a required CIR becomes less than or equal to a prescribed value in the estimated average reception CIR distribution.

12. A base station communicating with a mobile station in a mobile communication system, comprising:

means for controlling a transmission power of each radio channel at the mobile station so as to make a difference between a reception CIR (Carrier to Interference Ratio) and a target CIR of each radio channel at the base station smaller; and means for changing the target CIR for each radio channel, according to a channel quality of each radio channel at either one of the base station and the mobile station;

wherein said either one of the base station and the mobile station has measurement means for measuring a distribution of the reception CIR for each radio channel periodically, and the changing means changes the target CIR according to the distribution of the reception CIR measured by the measurement means; and the changing means changes the target CIR such that a probability for the reception CIR to be lower than a required CIR becomes less than or equal to a prescribed value in the distribution of the reception CIR measured by the measurement means.

13. A mobile station communicating with a base station in a mobile communication system, comprising:

means for controlling a transmission power of each radio channel at the base station so as to make a difference between a reception CIR (Carrier to Interference Ratio) and a target CIR of each radio channel at the mobile station smaller; and means for changing the target CIR for each radio channel, according to a channel quality of each radio channel at either one of the base station and the mobile station;

wherein said either one of the base station and the mobile station has measurement means for measuring a distribution of the reception CIR for each radio channel periodically, and the changing means changes the target CIR according to the distribution of the reception CIR measured by the measurement means; and the changing means changes the target CIR such that a probability for the reception CIR to be lower than a required CIR becomes less than or equal to a prescribed value in the distribution of the reception CIR measured by the measurement means.

14. A base station in communication with a mobile station in a mobile communication system, comprising:

means for controlling a transmission power of each radio channel at the mobile station so as to make a difference between a reception CIR (Carrier to Interference Ratio) and a target CIR of each radio channel at the base station smaller; and means for setting the target CIR for all radio channels at the base station independently, according to a channel quality of each radio channel at either one of the base station and the mobile station;

wherein said either one of the base station and the mobile station has measurement means for measuring a distribution of the reception CIR for each radio channel, the base station has learning means for learning an average reception CIR distribution for the base station from the distribution measured by the measurement means, and the setting means sets the target CIR according to the average reception CIR distribution learned by the learning means such that a probability for the reception CIR to be lower than a required CIR becomes less than or equal to a prescribed value in the average reception CIR distribution learned by the learning means.

15. A base station communicating with a mobile station in a mobile communication system, comprising:

means for controlling a transmission power of each radio channel at the mobile station so as to make a difference between a reception CIR (Carrier to Interference Ratio) and a target CIR of each radio channel at the base station smaller; and means for changing the target CIR for each radio channel, according to a channel quality of each radio channel at either one of the base station and the mobile station;

wherein said either one of the base station and the mobile station has measurement means for measuring a number of reception paths and a fading pitch for each radio channel periodically, and the changing means changes the target CIR according to the number of reception paths and the fading pitch measured by the measurement means.

16. A mobile station communicating with a base station in a mobile communication system, comprising:

means for controlling a transmission power of each radio channel at the base station so as to make a difference between a reception CIR (Carrier to Interference Ratio) and a target CIR of each radio channel at the mobile station smaller; and means for changing the target CIR for each radio channel, according to a channel quality of each radio channel at either one of the base station and the mobile station;

wherein said either one of the base station and the mobile station has measurement means for measuring a number of reception paths and a fading pitch for each radio channel periodically, and the changing means changes the target CIR according to the number of reception paths and the fading pitch measured by the measurement means.

17. A method of transmission power control in a mobile communication system including a mobile station and a base station, the method comprising the steps of:

controlling a transmission power of each radio channel at the base station so as to make a difference between a reception CIR (Carrier to Interference Ratio) and a target CIR of each radio channel at the mobile station smaller; and setting the target CIR for all radio channels at the mobile station independently, according to a channel quality of each radio channel at either one of the base station and the mobile station;

wherein said either one of the base station and the mobile station has measurement means for measuring a distribution of the reception CIR for each radio channel, the mobile station has learning means for learning an average reception CIR distribution for the mobile station from the distribution measured by the measurement means, and the setting step sets the target CIR according to the average reception CIR distribution learned by the learning means such that a probability for the reception CIR to be lower than a required CIR becomes less than or equal to a prescribed value in the average reception CIR distribution learned by the learning means.

18. A method of transmission power control in a mobile communication system including a mobile station and a base station, the method comprising the steps of:

controlling a transmission power of each radio channel at the base station so as to make a difference between a reception CIR (Carrier to Interference Ratio) and a target CIR of each radio channel at the mobile station smaller; and setting the target CIR for all radio channels at the mobile station independently, according to a channel quality of each radio channel at either one of the base station and the mobile station;

wherein said either one of the base station and the mobile station has measurement means for measuring a number of reception paths and a fading pitch for each radio channel, the mobile station has learning means for learning an average number of reception paths and an average fading pitch for the mobile station from the number of reception paths and the fading pitch measured by the measurement means, and the setting step sets the target CIR according to the average number of reception paths and the average fading pitch learned by the learning means.

19. The method of claim 18, wherein the setting step estimates an average reception CIR distribution from the average number of reception paths and the average fading pitch learned by the learning means, and sets the target CIR such that a probability for the reception CIR to be lower than a required CIR becomes less than or equal to a prescribed value in the estimated average reception CIR distribution.

20. A mobile station in communication with a base station in a mobile communication system, comprising:

means for controlling a transmission power of each radio channel at the base station so as to make a difference between a reception CIR (Carrier to Interference Ratio) and a target CIR of each radio channel at the mobile station smaller; and means for setting the target CIR for all radio channels at the mobile station independently, according to a channel quality of each radio channel at either one of the base station and the mobile station;

wherein said either one of the base station and the mobile station has measurement means for measuring a distribution of the reception CIR for each radio channel, the mobile station has learning means for learning an average reception CIR distribution for the mobile station from the distribution measured by the measurement means, and the setting means sets the target CIR according to the average reception CIR distribution learned by the learning means such that a probability for the reception CIR to be lower than a required CIR becomes less than or equal to a prescribed value in the average reception CIR distribution learned by the learning means.

21. A mobile station in communication with a base station in a mobile communication system, comprising:

means for controlling a transmission power of each radio channel at the base station so as to make a difference between a reception CIR (Carrier to Interference Ratio) and a target CIR of each radio channel at the mobile station smaller; and means for setting the target CIR for all radio channels at the mobile station independently, according to a channel quality of each radio channel at either one of the base station and the mobile station;

wherein said either one of the base station and the mobile station has measurement means for measuring a number of reception paths and a fading pitch for each radio channel, the mobile station has learning means for learning an average number of reception paths and an average fading pitch for the mobile station from the number of reception paths and the fading pitch measured by the measurement means, and the setting means sets the target CIR according to the average number of reception paths and the average fading pitch learned by the learning means.

* * * * *